(No Model.)
J. D. BROODER.
PACKER FOR OIL WELLS.
No. 350,655. Patented Oct. 12, 1886.
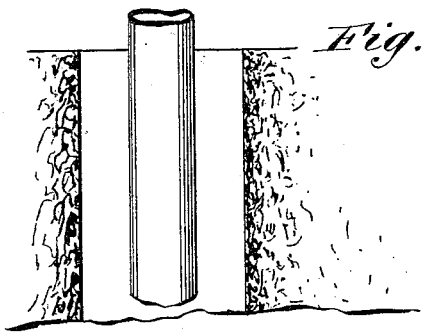
Fig. 1
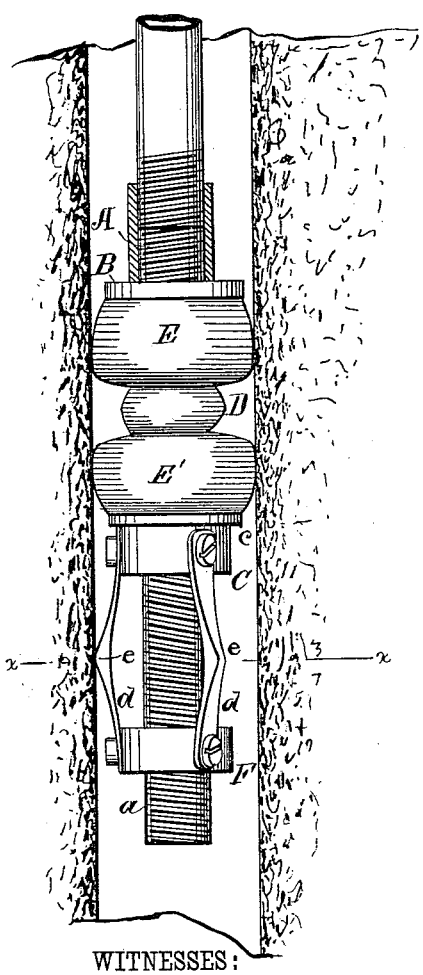
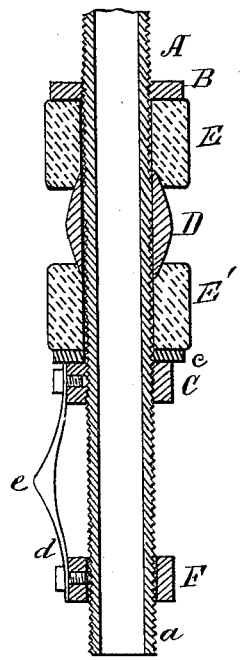
Fig. 2
Fig. 3
WITNESSES:
C. Neveux
C. Sedgwick
INVENTOR:
J. D. Brooder
BY Munn & Co.
ATTORNEYS.

United States Patent Office.

JOHN D. BROODER, OF KANE, ASSIGNOR TO HIMSELF, AND F. J. CLEMENGER, OF SOUTH OIL CITY, PENNSYLVANIA.

PACKER FOR OIL-WELLS.

SPECIFICATION forming part of Letters Patent No. 350,655, dated October 12, 1886.

Application filed November 19, 1885. Renewed August 6, 1886. Serial No. 210,209. (No model.)

*To all whom it may concern:*

Be it known that I, JOHN D. BROODER, of Kane, McKean county, and State of Pennsylvania, have invented a new and useful Improvement in Packers for Oil-Wells, of which the following is a specification, reference being had to the annexed drawings, forming a part thereof, in which—

Figure 1 is a side elevation. Fig. 2 is a longitudinal section. Fig. 3 is a transverse section taken on line $x\,x$ in Fig. 1.

Similar letters of reference indicate corresponding parts in all the figures.

The object of my invention is to provide a reliable easily-applied packer for the tubing of oil-wells and gas-wells.

My invention consists of a conical expander placed between two rubber packing-rings, and the combination therewith of a device for forcing the rubber packing-rings upon the conical expander.

The tube-section A is provided at one end with a right-hand thread, to admit of its attachment to the lower end of the well-tubing. The remaining portion of the tube is provided with a left-hand thread. Upon the right-hand thread of the tube A is placed a collar, B, and upon the left-hand thread, $a$, is placed a nut, C, and between the nut C and the collar B is placed an expander, D, consisting of a double cone apertured to receive the tube A. The double cone D is preferably made of glass; but it may be made of any other non-corrosive material. Between the smaller ends of the double cone D and collar B and nut C are placed elastic rubber rings E E′, which may be expanded by turning the nut C, thus forcing the elastic ring E′ upon one end of the double cone D, and driving the other end of the double cone into the elastic ring E, thus expanding both of the elastic rings.

To prevent the wear of the elastic ring E′ a washer, $c$, is placed between the nut C and the elastic ring. A collar, F, fitting loosely over the left-hand threads, and of the same size externally as the nut C, is connected with the nut C by three outwardly-bowed springs, $d$, each having in the middle an annular projection, $e$, for engaging the walls of the well to which the packing is applied.

My improved packer is secured to the lower end of the tubing of the well, and it is lowered with the tubing into the well in an unexpanded condition, and when it reaches the position it is to occupy in the well the pipe is turned so as to force the rings E E′ onto the expander D in the manner already described, thus causing the elastic rings to entirely fill the well.

When it is desired to remove the packer from the well, it is only necessary to turn the pipe in the opposite direction, so as to relieve the pressure of the nut C against the elastic ring E′, when the rings E E′ will contract of their own elasticity. The projections of the springs $d$ engage the walls of the well and retain the nut C in a fixed position, so as to admit of turning the tube A in either direction, and the beveled form of the projections of the springs permits of the insertion and removal of the packer without liability of catching upon the walls of the well.

It is obvious that a single elastic ring might be employed by using two separate cones, with their smaller ends entering opposite ends of the rubber ring. It is also obvious that a series of rings and of single cones might be employed in a similar way. Therefore I do not limit or confine my invention to the precise form herein shown and described.

Having thus described my invention, what I claim as new, and desire to secure by Letters Patent, is—

1. In a packer for oil-wells and gas-wells, an expanding-cone formed of glass, substantially as herein specified.

2. In a packer for oil-wells and gas-wells, the combination, with a tube-section having upon one end a right-hand thread and upon the other a left-hand thread, of the collar B, elastic rings E E′, the double cone D, and means for forcing the elastic rings upon the double cone, as herein specified.

3. In a packer for oil-wells and gas-wells, the combination of the tube A, having a right-hand thread on one end and a left-hand thread on the other end, a collar, B, elastic rings E E', the double cone D, the nut C, springs *d*, provided with projections *e*, and a collar, F, substantially as herein shown and described.

4. As an improved article of manufacture, a packer for oil-wells, formed of the tube A, provided with right and left hand threads, the collar B, elastic rings E E', double glass cone D, nut C, collar F, springs *d*, provided with projections *e*, and the washer *c*, substantially as herein shown and described.

JOHN D. BROODER.

Witnesses:
 JOHN HAMILL,
 W. B. SMITH.